(12) United States Patent
Kalita et al.

(10) Patent No.: US 12,522,923 B2
(45) Date of Patent: Jan. 13, 2026

(54) ADVANCED BARRIER NICKEL OXIDE (BNIO) COATING DEVELOPMENT FOR PROCESS CHAMBER COMPONENTS VIA OZONE TREATMENT

(71) Applicant: Applied Materials, Inc., Santa Clara (CA)

(72) Inventors: Laksheswar Kalita, Santa Clara, CA (US); Joseph Behnke, Santa Clara, CA (US); David Knapp, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 596 days.

(21) Appl. No.: 17/692,351

(22) Filed: Mar. 11, 2022

(65) Prior Publication Data
US 2023/0287568 A1    Sep. 14, 2023

(51) Int. Cl.
| | | |
|---|---|---|
| *C23C 16/40* | (2006.01) | |
| *C23C 14/16* | (2006.01) | |
| *C23C 14/58* | (2006.01) | |
| *C23C 16/455* | (2006.01) | |
| *C23C 18/16* | (2006.01) | |
| *C23C 18/32* | (2006.01) | |

(52) U.S. Cl.
CPC ...... *C23C 16/45565* (2013.01); *C23C 14/165* (2013.01); *C23C 14/5853* (2013.01); *C23C 16/40* (2013.01); *C23C 18/1689* (2013.01); *C23C 18/32* (2013.01)

(58) Field of Classification Search
None
See application file for complete search history.

(56) References Cited

U.S. PATENT DOCUMENTS

| | | |
|---|---|---|
| 3,574,930 A | 4/1971 | Riddel et al. |
| 4,167,416 A | 9/1979 | Zolla |
| 4,659,379 A | 4/1987 | Singh et al. |
| 5,344,425 A | 9/1994 | Sawyer |
| 5,849,170 A | 12/1998 | Djokic et al. |
| 5,952,718 A | 9/1999 | Ohtsuka et al. |
| 6,280,597 B1 | 8/2001 | Kashiwada et al. |
| 2002/0093101 A1 | 7/2002 | Iyer et al. |
| 2003/0106793 A1 | 6/2003 | Sirkis et al. |

(Continued)

FOREIGN PATENT DOCUMENTS

| | | |
|---|---|---|
| CN | 105261491 A | 1/2016 |
| JP | S61253383 A | 11/1986 |

(Continued)

OTHER PUBLICATIONS

PCT International Search Report and Written Opinion for International Application No. PCT/US2023/011367, mailed May 24, 2023, 11 pages.

(Continued)

*Primary Examiner* — David P Turocy
(74) *Attorney, Agent, or Firm* — Lowenstein Sandler LLP

(57) ABSTRACT

Described herein is a chamber component including a metal layer comprising nickel and a barrier layer of nickel oxide over the metal layer. The barrier layer of nickel oxide may be formed by ozone treating the chamber component with air, nitrogen or argon $O_2$, $O_3$ at a temperature from about 25° C. to about 350° C.

8 Claims, 5 Drawing Sheets

(56) References Cited

U.S. PATENT DOCUMENTS

| | | |
|---|---|---|
| 2004/0045503 A1 | 3/2004 | Lee et al. |
| 2005/0155625 A1 | 7/2005 | Jangjian et al. |
| 2005/0249618 A1 | 11/2005 | Nonaka et al. |
| 2006/0228569 A1 | 10/2006 | Kojima et al. |
| 2007/0203041 A1 | 8/2007 | Lee |
| 2009/0140262 A1 | 6/2009 | Ohki et al. |
| 2011/0101076 A1 | 5/2011 | Ogaki et al. |
| 2012/0037930 A1 | 2/2012 | Höppel |
| 2012/0220116 A1 | 8/2012 | Noori et al. |
| 2013/0115778 A1 | 5/2013 | Xue et al. |
| 2015/0110965 A1 | 4/2015 | Brunner et al. |
| 2016/0002811 A1 | 1/2016 | Sun et al. |
| 2018/0080888 A1 | 3/2018 | Nazarian |
| 2018/0330923 A1 | 11/2018 | Tran et al. |
| 2019/0323127 A1 | 10/2019 | Kalita et al. |
| 2021/0032745 A1 | 2/2021 | Enman et al. |

FOREIGN PATENT DOCUMENTS

| | | | |
|---|---|---|---|
| JP | H10312976 A | 11/1998 | |
| JP | H1192912 A | 4/1999 | |
| JP | 2003-342752 A | 12/2003 | |
| JP | 2004360066 A * | 12/2004 | ........... C23C 28/321 |
| JP | 2005089860 A | 4/2005 | |
| JP | 2006283141 A | 10/2006 | |
| JP | 2010006010 A | 1/2010 | |
| JP | 2013-256686 A | 12/2013 | |
| KR | 19980071010 A | 10/1998 | |
| WO | WO-2005014881 A2 * | 2/2005 | ............... B24C 1/06 |
| WO | 2020196061 A1 | 10/2020 | |

OTHER PUBLICATIONS

International Search Report and Written Opinion for International Application No. PCT/US2022/045268, mailed Feb. 2, 2023, 11 Pages.

International Search Report and Written Opinion for International Application No. PCT/US2023/11367, mailed May 24, 2023, 9 pages.

Kim Y., et al., "Preparation of Nickel Oxide Films by Anodizing," Korean Chemical Engineering Research, Apr. 2012, vol. 50, No. 2, pp. 204-210.

* cited by examiner

ADVANCED BARRIER NICKEL OXIDE (BNIO) COATING DEVELOPMENT FOR PROCESS CHAMBER COMPONENTS VIA OZONE TREATMENT

TECHNICAL FIELD

Embodiments of the present disclosure relate, in general, to erosion resistant metal oxide coated chamber components and methods of forming and using such coated chamber components.

BACKGROUND

In the semiconductor industry, devices are fabricated by a number of manufacturing processes producing structures of an ever-decreasing size. As device geometries shrink, controlling the process uniformity and repeatability of devices becomes much more challenging.

Various semiconductor manufacturing processes use high temperatures, high energy plasma (such as remote and direct fluorine plasma such as $NF_3$, $CF_4$, and the like), a mixture of corrosive gases, corrosive cleaning chemistries (e.g., hydrofluoric acid) and combinations thereof. These extreme conditions may result in a reaction between materials of components within the process chamber and the plasma or corrosive gases to form metal fluorides, metal oxyfluorides, particles, other trace metal contaminates and high vapor pressure gases (e.g., $AlF_x$, $AlOF_x$, $NiOF_x$). Such gases may readily sublime and deposit on other components within the chamber. During a subsequent process step, the deposited material may release from the other components as particles and fall onto the wafer causing defects. Additional issues caused by such reactions include deposition rate drift, etch rate drift, compromised film uniformity, and compromised etch uniformity. It is beneficial to reduce these defects with a stable, non-reactive coating on chamber components to limit the sublimation and/or formation of particles and metal contaminants on the chamber components within the chamber.

Hence, certain semiconductor processing chamber components (e.g., liners, doors, lids, shower heads and so on) include an electroless nickel plated (ENP) surface to reduce these defects. However, the ENP surface has been found to develop a rich oxyfluoride-containing layer in presence of moisture, oxygen after use in a fluorine-based atmosphere and at higher temperatures of about 150° C. or above. Without being limited to a theory, the oxyfluoride-containing layer develops because of contamination during use, thus the oxyfluoride-containing layer can be considered a contamination layer. Further, after processing a few hundreds of wafers, it has been found that the fluorine-containing layer lessens the lifetime of one or more components of the process chamber and a mean wafers between cleaning (MWBC) metric.

SUMMARY

In some embodiments of the present disclosure, a chamber component for a processing chamber may include a body; a metal plating on at least one surface of the body, the metal plating comprising nickel; and a barrier layer on the metal plating. In some embodiments, the barrier layer may include a nickel oxide. In some embodiments, the metal plating may include nickel and phosphorus. In some embodiments, the metal plating may include nickel and is free of phosphorous. In some embodiments, the body includes aluminum, an aluminum alloy, aluminum nitride, alumina, or combinations thereof. In some embodiments, the metal plating has a thickness of about 20 microns to about 75 microns, and the barrier layer has a thickness of about 2 nm to about 50 nm. In some embodiments, the barrier layer has an average surface roughness (Ra) of about 2 micro-inches to about 70 micro-inches. In some embodiments, the chamber component may be a showerhead for a process chamber.

In other embodiments of the present disclosure, a method of protecting a chamber component includes forming a metal plating on a body of the chamber component, wherein the metal plating may include nickel, and performing an ozone treatment on the metal plating to form a barrier layer on the metal plating, wherein the barrier layer may include nickel oxide. In some embodiments, the barrier layer may have a thickness from about 4 nm to about 500 nm. In some embodiments, forming the metal plating may include performing electroless metal plating, and wherein the metal plating further comprises phosphorus. In some embodiments, the body may include an aluminum alloy, aluminum nitride, alumina, or combinations thereof.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1A:
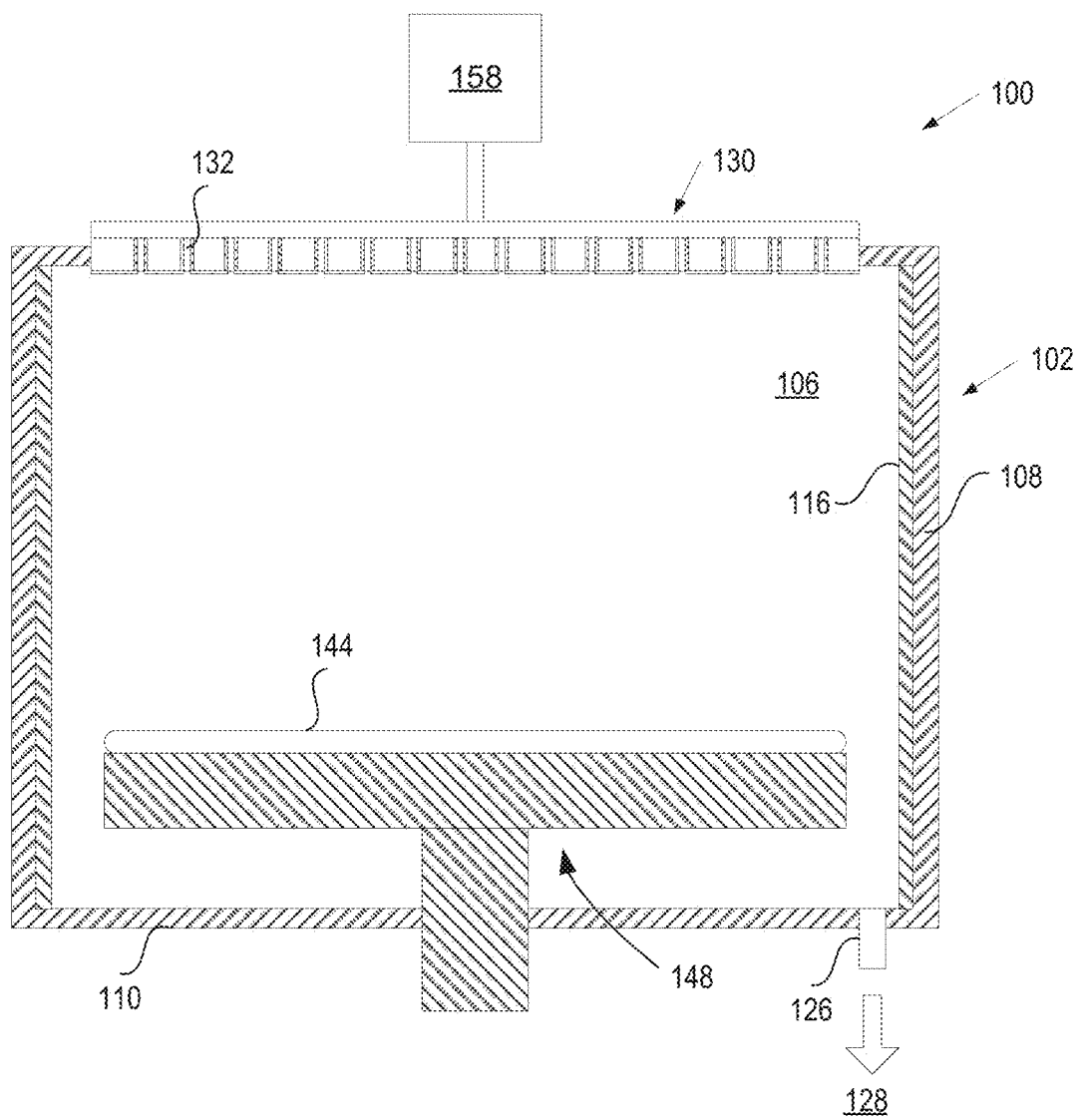
FIG. 1A depicts a sectional view of one embodiment of a processing chamber.

Embodiments disclosed herein describe coated articles, coated chamber components, methods of coating articles and chamber components, methods of reducing or eliminating particles from semiconductor processing chambers, and methods of using coated articles and chamber components and processing chambers containing coated chamber components. To reduce reactions between component materials and reactive chemicals and/or plasmas, which form metal fluorides, metal oxyfluoride, particles, other trace metal contaminates and/or high vapor pressure gases, a metal layer (e.g., which may be a metal coating or metal plating) with a barrier layer is included. The metal layer may be a nickel-containing layer (e.g., a pure nickel layer or a layer having nickel as a primary constituent and additionally including other materials such as phosphorous and/or vanadium). The barrier layer may be a nickel oxide layer formed under controlled conditions. The barrier layer may be added to new chamber components to improve a lifespan of the chamber components and/or to reduce or eliminate a buildup of a contamination layer on the chamber component. Further, to improve the life of the coated articles or coated chamber components (which may be new or used chamber components), they may be treated to remove a contamination layer and to add a barrier layer over a metal layer on the chamber components.

It has been found that there is an interaction between fluorine and a metal layer (e.g., an ENP comprising nickel) on chamber components that adds oxides and/or fluorides to the metal layer. A native oxide naturally occurs on the metal layer due to exposure to air. However, the native oxide has undesirable properties. In particular, the native oxide interacts with process gases (e.g., fluorine) to form a contamination layer. The native oxide's interaction with fluorine causes discoloration and forms a black film (contamination layer) over the metal coating that produces particles that can contaminate processed substrates. If a black film/contamination layer is present on a chamber component such as a shower head, there may be a drop in yield for substrates processed by the process chamber that includes the shower head having the contamination layer.

Further, if there is a black film/contamination layer that forms while the chamber component is in use, the chamber component is removed and replaced.

Thus, embodiments improve the surface of chamber components such as showerheads to prevent the formation of the black film/contamination layer over a metal layer of the chamber components. It would be advantageous to have a protective barrier layer to prevent the chemical degradation of the surface metal layer and formation of the black film/contamination layer. Such a chamber component having a protective barrier layer may also degrade and/or become contaminated more slowly than a chamber component lacking the barrier layer, which may cause the chamber component with the barrier layer over the metal layer to have a higher mean wafers between cleaning than a chamber component with a metal layer and lacking the barrier layer. The mean wafers between cleaning represents the mean number of wafers that are processed between each cleaning of the chamber component. Such an increased mean wafers between cleaning may be particularly pronounced for chamber components used in chambers that perform processes at higher temperatures of about 200° C. or above.

In embodiments disclosed herein are chamber components for processing chambers and/or processing chambers containing such chamber components (e.g., semiconductor processing chambers), wherein the chamber components include a chamber component and a metal layer (e.g., a metal plating or a metal coating) on at least one surface of the chamber component. The metal layer may include an advanced barrier layer in embodiments.

In some embodiments, a chamber component may include a metal layer on a surface of the substrate. The chamber component or portions thereof may be composed of, without limitation, one or more of a metal, for example, aluminum, stainless steel and/or titanium, a ceramic, for example, alumina, silica and/or aluminum nitride, and/or combinations thereof. The metal layer may be an electroless metal plating including nickel or an electrolytic metal plating including nickel.

In some embodiments, a chamber component may be plated using an electroless plating process to form an electroless metal plating on one or more surface of the chamber component. In embodiments, the electroless metal plating may be a nickel-phosphorous plating. The electroless plating process can form a metal plating directly on the surface of the chamber component. In some embodiments, the chamber component may be plated using an electrolytic metal plating process. For example, the electrolytic plating process may form a layer containing nickel, silver and/or gold. In some embodiments, one or more surface of the chamber component may be coated using a sputtering process, such as a sputtering process that sputters a nickel-containing coating onto the one or more surface of the chamber component. The nickel containing coating may include, for example, 98-99 atomic % nickel and 1-2 atomic % vanadium.

In some embodiments, when the chamber component is coated with an electroless plating process, the chamber component is placed in a bath that contains nickel and phosphorous. The bath may include about 84% nickel and about 16% phosphorous, about 86% nickel and 14% phosphorous, about 88% nickel and about 12% phosphorous, about 90% nickel and about 10% phosphorous, about 92% nickel and about 8% phosphorous, about 94% nickel and about 6% phosphorous, and about 96% nickel and about 4% phosphorous. For example, the bath may include about 84-96% nickel and about 4-16% phosphorous.

In some embodiments, when the chamber component is plated with an electrolytic metal plating process, the coating is free of phosphorous. For example, the plating may be 100% nickel. In some embodiments, the chamber component is coated with a sputtered nickel. The sputtered nickel, as understood by one of skill in the art, may include nickel and vanadium. The vanadium may be present in the sputtered nickel in about 1% to about 2%.

In embodiments, when the chamber component includes a metal layer that is an electroless nickel plating or an electrolytic Ni plating, the layer may be in a thickness from about 20 microns to about 75 microns, from about 25 microns to about 70 microns, from about 30 microns to 60 microns, or from about 35 microns to about 50 microns.

In some embodiments, the metal layer may have a hardness from about 450 HV to about 500 HV. The roughness of the metal layer may be less than 50µ inch in embodiments.

The thickness of the metal layer formed by electroless plating may be targeted based on the amount of time that the chamber component is in the bath. The chamber component may be in the bath for about one minute to about three minutes to form the metal layer having a target thickness.

In some embodiments, a contamination layer may be found on the metal layer. The contamination layer may include a combination of nickel, fluorine and/or oxygen. In embodiments, the metal layer is a nickel layer that becomes slowly fluorinated over time due to exposure to fluorine-rich chemistries. For example, a contamination layer of nickel fluoride and/or nickel oxy-fluoride may be formed on the surface of the metal layer. The contamination layer may react to process gases differently than the metal layer, and may cause subtle changes to process chemistries. Additionally, or alternatively, the contamination layer may flake off of the chamber component and/or cause particle contamination on substrates processed in the process chamber in which the chamber component is installed. As a result, periodic maintenance may be performed on chamber components to remove those chamber components that include the contamination layer and to replace the removed chamber components with new chamber components that lack the contamination layer.

In embodiments, the chamber component includes a barrier layer comprising nickel oxide over a metal layer (e.g., a nickel layer). In embodiments, the formation of the barrier layer (e.g., the nickel oxide barrier layer) on the metal layer protects the metal layer from attack by process gases, and in particular to attack by fluorine-containing plasmas and other fluorine-containing chemistries. Accordingly, the barrier layer may be referred to as a protective layer. The nickel oxide barrier layer may be formed using an ozone treatment, which may include contacting the chamber component including a metal layer with gas (e.g., an ozone gas) at a temperature and pressure (or a portion thereof that is to have a nickel oxide barrier layer). The gas used during the ozone treatment may be ozone, which may optionally be mixed with one or more of air, nitrogen, argon, $O_2$, $O_3$ or a combination thereof. The chamber component may undergo an ozone treatment at a temperature from about 25° C. to about 350° C., preferably from about 175° C. to about 225° C. The chamber component may undergo an ozone treatment at a pressure of about atmospheric pressure or at a reduced pressure that is below atmospheric pressure. The ozone treatment may be performed from about 1 hour to about 50 hours, preferably from about 10 hours to about 12 hours. In some embodiments, the ozone treatment is conducted under vacuum conditions.

In some embodiments, the barrier layer may have a thickness from about 2 nm to about 500 nm, or from about 2 nm to about 100 nm (e.g., 5 nm, 10 nm, 15 nm, 20 nm, 30 nm, 40 nm, 50 nm, 60 nm, 80 nm, etc.). The thickness of the barrier layer may be controlled by adjusting the temperature of the ozone treatment, by adjusting the time of the ozone treatment, or a combination thereof.

Thus, the formation of a barrier layer in the present disclosure may be formed in a one-step process through an ozone treatment. Because the barrier layer may be formed in a one-step process, the method is more efficient than previous methods of forming a barrier layer.

In some embodiments, the ozone treatment produces a uniform barrier layer over the metal layer. The barrier layer may conformally cover the chamber component, including any features of the chamber component, with a substantially uniform thickness. In one embodiment, the barrier layer has a conformal coverage of the underlying surface that is coated (including coated surface features) with a uniform thickness having a thickness variation of less than about +/−20%, a thickness variation of +/−10%, a thickness variation of +/−5%, or a lower thickness variation.

Some coated chamber components include high aspect ratio features (e.g., features with aspect ratios of about 10:1 to 300:1 of length or height to width or inner diameter. An example of such a chamber component is a showerhead that includes multiple gas passages or holes therein. Some embodiments described herein enable high aspect ratio features of chamber components and other articles to be effectively coated with a barrier layer that is conformal within the high aspect ratio features and may cover the features with a substantially uniform coating (e.g., with a thickness variation of about +/−10% or less). The barrier layer is also very dense with a surface porosity and/or volume porosity (e.g., fraction of the volume of voids over total volume of the coating) of about 0% (e.g., the plasma resistant coating may be close to porosity-free) in some embodiments. The barrier layer may also have a surface porosity and/or volume porosity less than about 5%, less than about 4%, less than about 3%, less than about 2%, less than about 1%, less than about 0.5%, or about 0%.

Experimentation has shown that use of the nickel oxide barrier layer over a nickel layer on chamber components increases the serviceable lifetime of the chamber components by ten times. Accordingly, preventative maintenances may be reduced by two times up to ten times in embodiments as compared to the number and/or frequency of preventative maintenances performed to service and/or replace chamber components having an exposed nickel layer.

Some embodiments are described herein with reference to a showerhead and are particularly useful for coating chamber components having both high aspect ratio features and regions that are directly exposed to bombardment by a plasma. However, the barrier layer described herein can also be beneficially used on many other chamber components having metal layers that are exposed to plasma, such as chamber components for a plasma etcher (also known as a plasma etch reactor) or other processing chambers including walls, liners, bases, rings, view ports, lids, nozzles, substrate holding frames, electrostatic chucks (ESCs), face plates, selectivity modulation devices (SMDs), plasma sources, pedestals, and so forth.

Moreover, embodiments are described herein with reference to plated or coated chamber components and other articles that may cause reduced particle contamination when used in a process chamber for plasma rich processes. However, it should be understood that the plated or coated articles discussed herein may also provide reduced particle contamination when used in process chambers for other processes such as non-plasma etchers, non-plasma cleaners, chemical vapor deposition (CVD) chambers, physical vapor deposition (PVD) chambers, and so forth.

Referring now to the figures, FIG. 1A is a sectional view of a processing chamber 100 (e.g., a semiconductor processing chamber) having one or more chamber components that include a metal layer and a nickel oxide-containing barrier layer over the metal layer in accordance with embodiments of the present disclosure. The processing chamber 100 may be used for processes in which a corrosive plasma environment and/or corrosive chemistry is provided. For example, the processing chamber 100 may be a chamber for a plasma etch reactor (also known as a plasma etcher), a plasma cleaner, an atomic layer deposition (ALD) chamber that performs plasma-enhanced ALD, other deposition chambers, and so forth. Examples of chamber components that may include a metal layer and a barrier layer over the metal layer are a substrate support assembly 148, an electrostatic chuck (ESC), a ring (e.g., a process kit ring or single ring), a chamber wall, a base, a showerhead 130, a gas distribution plate, a liner, a liner kit, a shield, a plasma screen, a flow equalizer, a cooling base, a chamber viewport, a chamber lid, a nozzle, process kit rings, and so on.

In one embodiment, the metal layer is a nickel-containing layer (e.g., 100% nickel or nickel in combination with one or more additional materials such as phosphorous and/or vanadium). In one embodiment, the barrier layer is a nickel-oxide containing layer (e.g., 100% nickel oxide or nickel oxide with one or more additional materials such as phosphorous and/or vanadium). The metal layer and the barrier layer may be conformal thin films.

In one embodiment, the processing chamber 100 includes a chamber body 102 and a showerhead 130 that enclose an interior volume 106. The showerhead 130 may or may not include a gas distribution plate. For example, the showerhead may be a multi-piece showerhead that includes a showerhead base and a showerhead gas distribution plate bonded to the showerhead base. Alternatively, the showerhead 130 may be replaced by a lid and a nozzle in some embodiments, or by multiple pie shaped showerhead compartments and plasma generation units in other embodiments. The chamber body 102 may be fabricated from aluminum, stainless steel or other suitable material. The chamber body 102 generally includes sidewalls 108 and a bottom 110. Any of the showerhead 130 (or lid and/or nozzle), sidewalls 108 and/or bottom 110 may include the multi-layer plasma resistant coating.

An outer liner 116 may be disposed adjacent the sidewalls 108 to protect the chamber body 102. The outer liner 116 may be a halogen-containing gas resist material such as $Al_2O_3$ or $Y_2O_3$. The outer liner 116 may be coated with the multi-layer plasma resistant ceramic coating in some embodiments.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewalls 108 of the chamber body 102 and/or on a top portion of the chamber body. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or cleaning gases to the interior volume 106 through the showerhead 130 or lid and nozzle. The showerhead 130 includes multiple gas delivery holes 132 throughout the showerhead 130. The showerhead 130 may be or include aluminum, anodized aluminum, an aluminum alloy (e.g., Al 6061), or an anodized aluminum alloy. In some embodiments, the showerhead includes a gas distribution plate (GDP) bonded to the showerhead. The GDP may be, for example, Si or SiC. The GDP may additionally include multiple holes that line up with the holes in the showerhead.

Figure 1B:
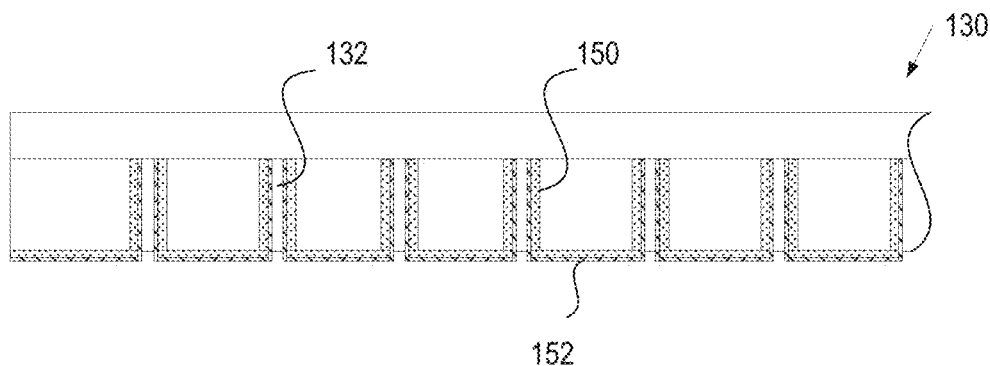
FIG. 1B depicts a sectional view of one embodiment of a showerhead for a processing chamber.

FIG. 1B illustrates a zoomed in view of a portion of the showerhead 130 of FIG. 1A. With reference to FIG. 1B, in embodiments the showerhead 130 is coated by a metal layer 150 and a barrier layer 152. In particular, in some embodiments a surface of the showerhead and walls of holes 132 in the showerhead are coated by a thin conformal metal layer 150. Additionally, the backside of the showerhead 130 and outer side walls of the showerhead may also be coated by the conformal metal layer 150. A non-line of sight deposition technique such as ALD or plating (e.g., electroplating or electroless plating) may be used to deposit or form the metal layer 150 on the surface of the showerhead 130 and on the walls of the holes 132 in the showerhead 130. Alternatively, a line-of-sight deposition technique such as sputtering may be used to form the metal layer. The metal layer 150 may be nickel, nickel doped with phosphorous, or nickel doped with vanadium in embodiments.

A barrier layer 152 covers the metal layer 150 at some or all regions of the surface of the showerhead 130. The barrier layer 152 may be formed using an ozone treatment. The barrier layer 152 may cover the metal layer on all surfaces of the chamber component, including on the inner walls of holes in the showerhead 130. The barrier layer may be a grown layer and may be conformal and uniform in embodiments. The uniform barrier layer may have a difference in thickness of less than about 5% across the surface of the showerhead in embodiments.

Examples of processing gases that may be used to process substrates in the processing chamber 100 include halogen-containing gases, such as $C_2F_6$, $SF_6$, $SiCl_4$, HBr, $NF_3$, $CF_4$, $CHF_3$, $CH_2F_3$, F, $Cl_2$, $CCl_4$, $BCl_3$ and $SiF_4$, among others, and other gases such as $O_2$, or $N_2O$. Examples of carrier gases include $N_2$, He, Ar, and other gases inert to process gases (e.g., non-reactive gases). The fluorine based gases may cause fluoride deposits to buildup on the holes of standard showerheads and/or a contamination layer to form on the holes of the showerheads. However, the holes 132 of showerhead 130 may be resistant to such fluoride buildup due to the barrier layer 152.

Referring back to FIG. 1A, a substrate support assembly 148 is disposed in the interior volume 106 of the processing chamber 100 below the showerhead 130. The substrate support assembly 148 holds a substrate 144 (e.g., a wafer) during processing. The substrate support assembly 148 may include an electrostatic chuck that secures the substrate 144 during processing, a metal cooling plate bonded to the electrostatic chuck, and/or one or more additional components. An inner liner may cover a periphery of the substrate support assembly 148. The inner liner may be a halogen-containing gas resist material such as $Al_2O_3$ or $Y_2O_3$. The substrate support assembly, portions of the substrate support assembly, and/or the inner liner may be coated with the metal layer and barrier layer in some embodiments.

Figure 2:
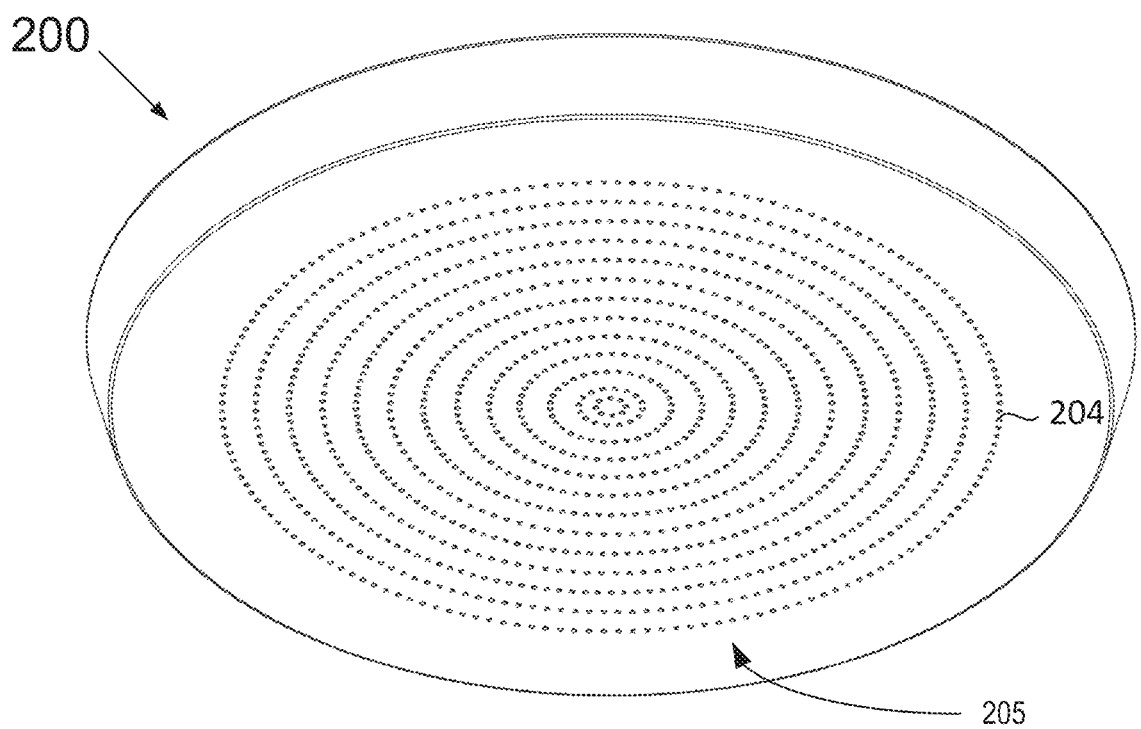
FIG. 2 illustrates one embodiment of a bottom view of a showerhead, in accordance with an embodiment.

FIG. 2 illustrates one embodiment of a bottom view of a showerhead 200. The showerhead 200 may have a series of gas conduits 204 (also referred to as holes) arranged concentrically that evenly distribute plasma gasses directly over a substrate or wafer to be etched or processed. The showerhead is depicted here having approximately 1100 gas conduits 204 arranged in evenly distributed concentric rings for even distributing of gasses. In another embodiment, the gas conduits 204 may be configured in alternative geometric configurations on the lower surface 205 of the showerhead (or on a lower surface of a GDP bonded to a showerhead). For example, the showerhead may have a square or rectangular configuration having rows and columns of gas conduits 204. It is to be understood that other shapes (e.g., triangle, pentagon, etc.) may be implemented and coated with a ceramic coating (e.g., an HPM coating) as described above. The showerhead 200 can have many gas conduits 204, as depicted, or as few gas conduits as appropriate depending on the type of reactor and/or process utilized.

In one embodiment, some or all gas conduits 204 do not include branches (e.g., each gas conduit may have a single entry point and a single exit point). Additionally, the gas conduits may have various lengths and orientation angles. Gas may be delivered to the gas conduits 204 via one or more gas delivery nozzles. Some gas conduits 204 may receive the gas before other gas conduits 204 (e.g., due to a proximity to a gas delivery nozzle). However, the gas conduits 204 may be configured to deliver gas to a substrate resting beneath the showerhead at approximately the same time based on varying the orientation angles, diameters and/or lengths of the gas conduits 204, or by using an additional flow equalizer. For example, gas conduits 204 that will receive gas first may be longer and/or have a greater angle (e.g., an angle that is further from 90 degrees) than conduits that will receive gas later.

Figure 3A:
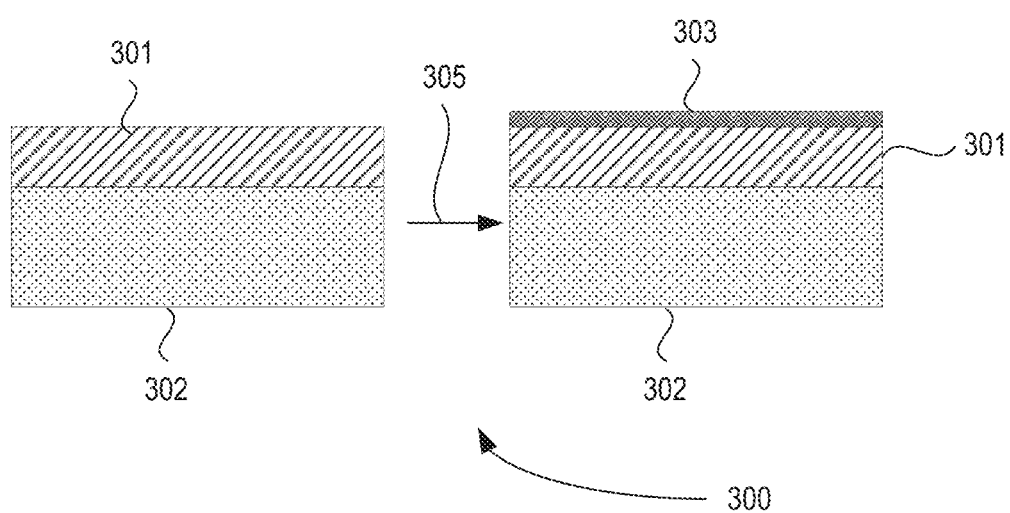
FIG. 3A illustrates a method of forming an advanced barrier oxide layer according to an embodiment.

As can be seen in FIG. 3A, a schematic 300 of ozone treating the metal plated coated chamber component is illustrated. In FIG. 3A, a metal plated chamber component includes a nickel layer 301 and a bare aluminum body 302 of the chamber component, wherein the nickel layer 301 is on a surface of the bare aluminum body 302. The metal plated chamber component undergoes an ozone treatment 305 according to the present disclosure. After being treated, the metal plated chamber component includes a dense barrier layer 303 of nickel oxide on a surface of the nickel layer 301. The barrier layer 303 of NiO may prevent discoloration of the metal layer. The barrier layer 303 may also prevent as the chamber component from becoming a source of particles on processed substrates. The barrier layer 303 of NiO may also inhibit the reaction of fluorine with nickel in the nickel layer 301 to prevent the formation of a discolored/contaminated layer.

Further, the barrier layer 303 may prevent a native oxide from forming on the nickel layer 301.

In some embodiments, the chamber component may be a used chamber component that has been used to perform one or more processes on substrates, where the processes exposed the substrates to a fluorine-rich environment. The chamber component may not have been coated with a barrier layer prior to use. Accordingly, the chamber component may include a contamination layer over the metal layer 302. In some embodiments, the chamber component may be refurbished by removing the contamination layer to expose the metal layer, and then form the barrier layer over the metal layer. A schematic of such embodiment is illustrated in schematic 350 of FIG. 3B.

Figure 3B:
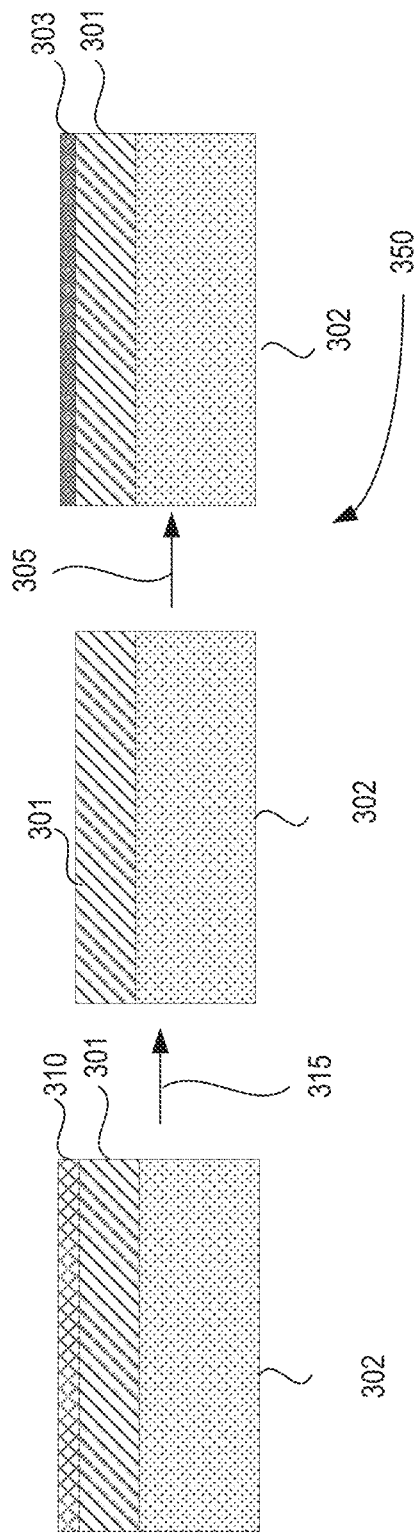
FIG. 3B illustrates another method of refurbishing and forming an advanced barrier oxide layer according to another embodiment.

In FIG. 3B, the chamber component includes an aluminum body 302 having a metal layer 301 disposed thereon, and a contamination layer 310 over the metal layer 301. The chamber component may undergo a cleaning process 315 to strip the contamination layer 310 from the metal layer 301. The chamber component having the cleaned metal layer 301 may then be processed using an ozone treatment process 305 to form barrier layer 303, as described in more detail in the present disclosure. After cleaning and ozone treatment, the contamination layer 310 is removed and a barrier layer 303 of dense nickel oxide is present over the metal layer 301.

Figure 4:
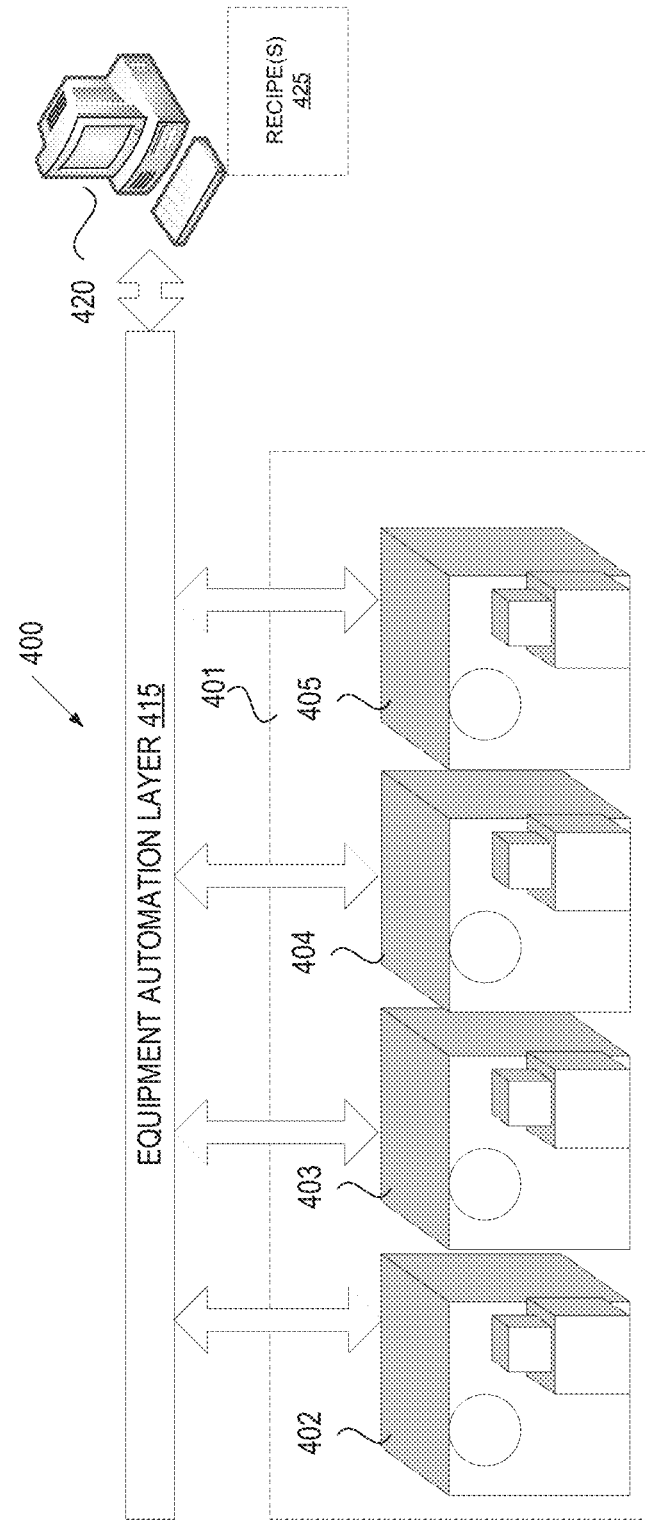
FIG. 4 illustrates an example architecture of a manufacturing system.

FIG. 4 illustrates an example architecture of a manufacturing system 400. The manufacturing system 400 may be a manufacturing system for applying platings and/or coatings to articles such as chamber components. In one embodiment, the manufacturing system 400 includes manufacturing machines 401 (e.g., processing equipment) connected to an equipment automation layer 415. The manufacturing machines may include a polisher 402, a plating system 403, a sputtering system 404, an ozone treatment system 405, and/or other machines. The manufacturing system 400 may further include one or more computing device 420 connected to the equipment automation layer 415. In alternative embodiments, the manufacturing system 400 may include more or fewer components. For example, the manufacturing system 400 may include manually operated (e.g., off-line) manufacturing machines 401 without the equipment automation layer 415 or the computing device 420.

Polisher 402 is a machine configured to polish or smoothen the surface of articles such as chamber components for processing chambers. Polisher 402 may be, for example, a chemical mechanical planarization (CMP) device or an abrasive polisher. For example, a motorized abrasive pad may be used to smoothen the surface of an article. A sander may rotate or vibrate the abrasive pad while the abrasive pad is pressed against a surface of the article. A roughness achieved by the abrasive pad may depend on an applied pressure, on a vibration or rotation rate and/or on a roughness of the abrasive pad.

Plating system 403 is a system that performs electroplating (e.g., of Ni) or electroless plating (e.g., of Ni). Plating system 403 may be an electroplating system that applies a current to reduce dissolved metal cations so that they form a thin coherent metal coating on the article (e.g., on surfaces of a chamber component such as an aluminum chamber component). Specifically, the article to be plated may be the cathode of a circuit and a metal donor may be the anode of the circuit. The article and metal donor may be immersed in an electrolyte containing one or more dissolved metal salts and/or other ions that increase an electrical conductivity of the electrolyte. Metal from the metal donor than plates a surface of the article.

Another type of plating system that may be used is an electroless plating system that performs electroless plating. Electroless plating, also known as chemical or auto-catalytic plating, is a non-galvanic plating method that involves several simultaneous reactions in an aqueous solution, which occur without the use of external electrical power. The reaction is accomplished when hydrogen is released by a reducing agent, normally sodium hypophosphite or thiourea, and oxidized, thus producing a negative charge on the surface of the part.

Sputtering system 404 is a physical vapor deposition (PVD) system that performs deposition via sputtering. Sputtering system 404 may perform a sputtering deposition process that bombards a target with energetic particles of a gas or plasma to cause the target to eject or sputter microscopic particles onto a surface of the chamber component.

Ozone treatment system 405 is a system configured to perform an ozone treatment on a chamber component. The ozone treatment system 405 may be a standard process chamber, in which the chamber component will be ultimately used to process substrates. Alternatively, the ozone treatment system may be a different process chamber than the process chamber in which the coated chamber component will ultimately be installed and used. The ozone treatment may be performed, as described herein, to form the nickel oxide barrier layer in-situ in the chamber in which it will ultimately be used. Alternatively, the ozone treatment may be performed, as described herein, to form the nickel oxide barrier layer ex-situ, in a different chamber from the chamber in which the chamber component will be used.

The equipment automation layer 415 may interconnect some or all of the manufacturing machines 401 with computing devices 420, with other manufacturing machines, with metrology tools and/or other devices. The equipment automation layer 415 may include a network (e.g., a location area network (LAN)), routers, gateways, servers, data stores, and so on. Manufacturing machines 401 may connect to the equipment automation layer 415 via a SEMI Equipment Communications Standard/Generic Equipment Model (SECS/GEM) interface, via an Ethernet interface, and/or via other interfaces. In one embodiment, the equipment automation layer 415 enables process data (e.g., data collected by manufacturing machines 401 during a process run) to be stored in a data store (not shown). In an alternative embodiment, the computing device 420 connects directly to one or more of the manufacturing machines 401.

In one embodiment, some or all manufacturing machines 401 include a programmable controller that can load, store and execute process recipes. The programmable controller may control temperature settings, gas and/or vacuum settings, time settings, etc. of manufacturing machines 401. The programmable controller may include a main memory (e.g., read-only memory (ROM), flash memory, dynamic random access memory (DRAM), static random access memory (SRAM), etc.), and/or a secondary memory (e.g., a data storage device such as a disk drive). The main memory and/or secondary memory may store instructions for performing heat treatment processes described herein.

The programmable controller may also include a processing device coupled to the main memory and/or secondary memory (e.g., via a bus) to execute the instructions. The processing device may be a general-purpose processing device such as a microprocessor, central processing unit, or the like. The processing device may also be a special-purpose processing device such as an application specific integrated circuit (ASIC), a field programmable gate array (FPGA), a digital signal processor (DSP), network processor, or the like. In one embodiment, programmable controller is a programmable logic controller (PLC).

In one embodiment, the manufacturing machines 401 are programmed to execute recipes that will cause the manufacturing machines to polish an article, clean an article, plate an article, form a barrier layer on an article (e.g., via an ozone treatment), and so on. In one embodiment, the manufacturing machines 401 are programmed to execute recipes that perform operations of a multi-step process for manufacturing an article having a metal layer and a barrier layer, as described with reference to FIGS. 5-6. The computing device 420 may store one or more plating, oxidizing, cleaning and/or polishing recipes 425 that can be downloaded to the manufacturing machines 401 to cause the manufacturing machines 401 to manufacture articles in accordance with embodiments of the present disclosure.

Figure 5A:
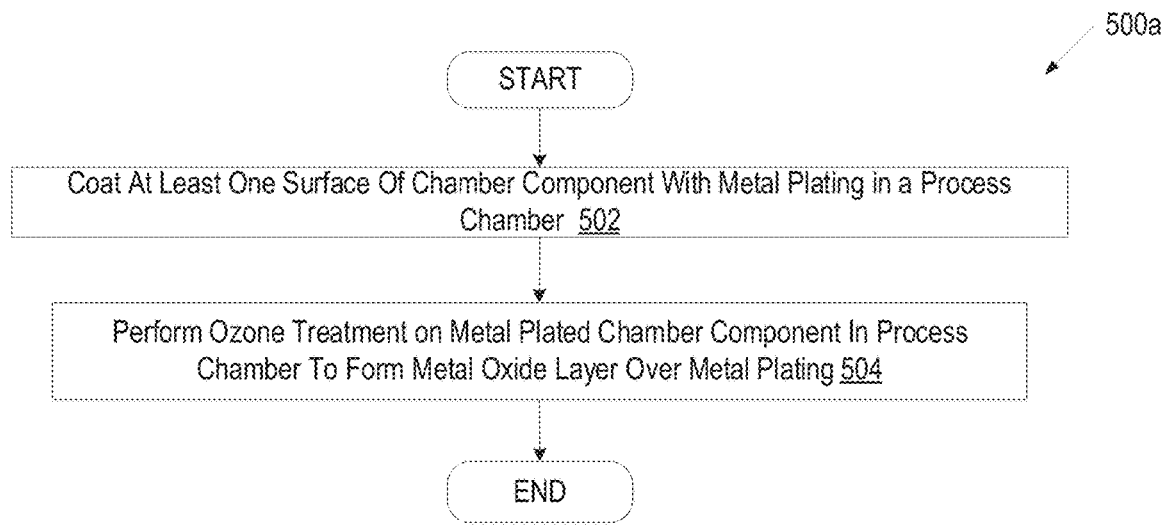
FIG. 5A is a flow chart representing a method of forming an advanced barrier oxide layer according to an embodiment.
Figure 6:
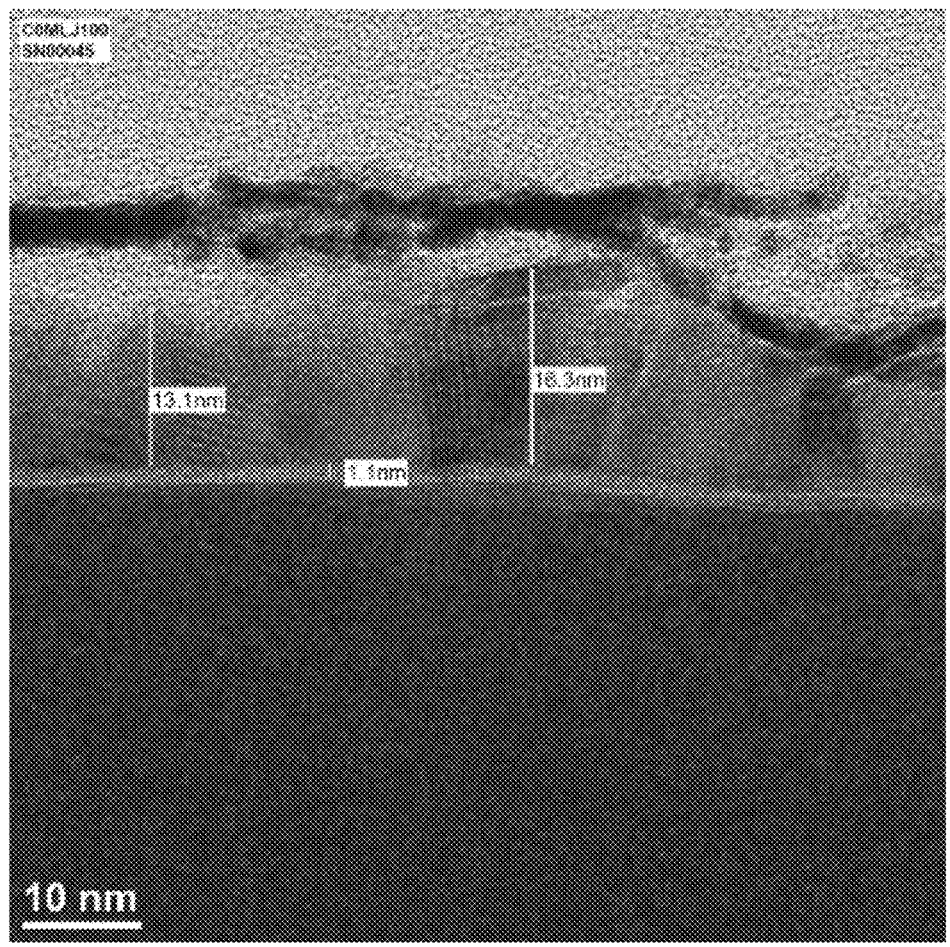
FIG. 6 is a TEM image illustrating the uniformity and thickness of an advanced barrier layer according to an embodiment.

In an embodiment, a metal plated coated chamber component may be manufactured according to method 500a or 500b. The metal plated coated chamber component may be a new or used component in embodiments. FIG. 5A is a flow chart representing a method of forming an advanced barrier layer on a metal plated or metal coated chamber component according to an embodiment on a new component. In the method 500a, at block 502 at least one surface of a chamber component is coated with a metal plating. The metal plating may be formed through electroplating or electroless plating. In one embodiment, the metal plated chamber component includes a nickel layer and bare aluminum body as described in FIG. 3A.

At block 502, the metal plated chamber component is placed in a process chamber 502. The chamber component may be inserted into a process chamber as a substrate, a metal oxide barrier layer may be applied onto a metal layer of the chamber component, and the chamber component may then be removed from the process chamber and installed into another (different) process chamber for use on product substrates.

In the process chamber, an ozone treatment is performed on the metal plated chamber component at operation 504. The ozone treatment may include exposing the chamber component to a gas containing ozone at a set temperature and vacuum for a set time period. The ozone treatment may occur from about 1 hour to about 50 hours, from 2 hours to about 45 hours, from about 3 hours to about 40 hours, from about 4 hours to about 35 hours, from about 5 hours to about 30 hours, or from about 10 hours to about 20 hours. The ozone treatment may occur at a temperature of about 25° C. to about 350° C., about 30° C. to about 325° C., about 35° C. to about 300° C., about 40° C. to about 275° C., about 45° C. to about 250° C., about 50° C. to about 225° C., about 55° C. to about 200° C., about 60° C. to about 175° C., about 65° C. to about 150° C., about 70° C. to about 125° C., or about 75° C. to about 100°, preferably at a temperature about 175° C. to about 225° C. The ozone treatment may occur at atmospheric pressure or at a reduced pressure that is below atmospheric pressure. The ozone treatment may be conducted by flowing a gas containing ozone and optionally one or more of air, nitrogen, argon, $O_2$, $O_3$, or a combination thereof mixed with the ozone. The ozone treatment may also be conducted under vacuum conditions.

Figure 5B:
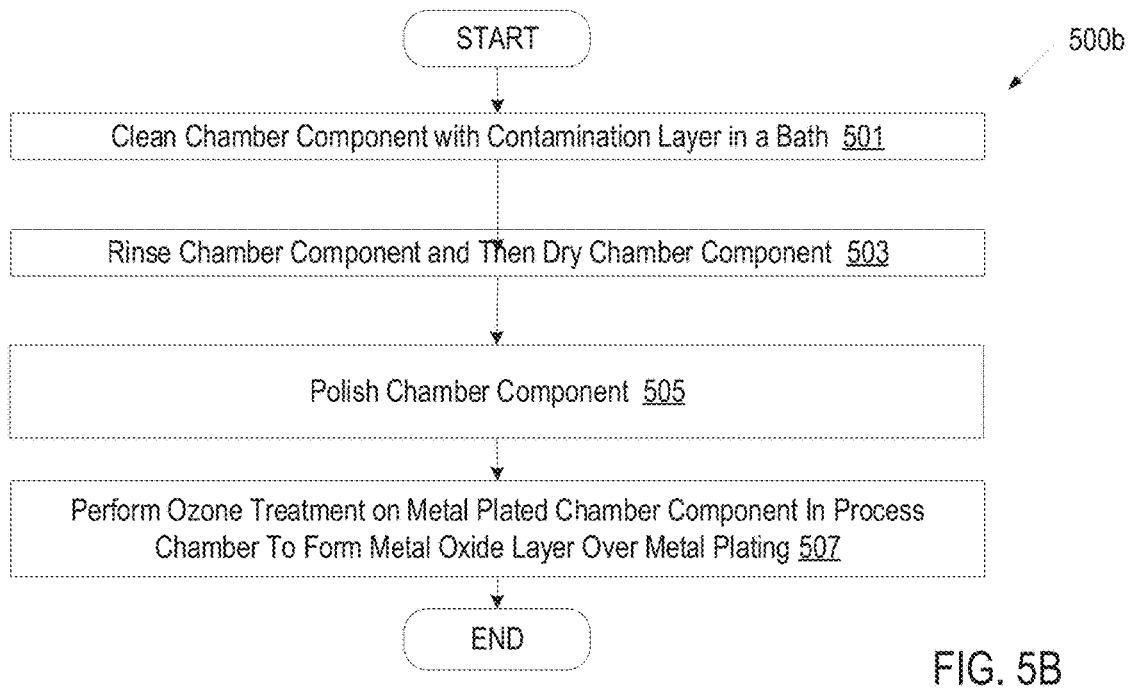
FIG. 5B is a flow chart representing a method of forming an advanced barrier oxide layer according to an another embodiment.

FIG. 5B is a flow chart representing a method 500b of forming an advanced barrier layer on a used metal plated or metal coated chamber component according to an embodiment. Method 500b may be performed on chamber components having a metal layer (e.g., a metal plating) that has been used to perform one or more cycles of one or more manufacturing processes that expose the chamber component to chemistries that cause formation of a contamination layer on the metal layer. The contamination layer may contain oxygen, fluorine and/or one or more process elements. The contamination layer may cause particle contamination and/or negatively affect future processes performed in the process chamber in embodiments. Accordingly, in some embodiments of the present disclosure, when a contamination layer is present on the metal plated chamber component, the chamber component is placed in a bath 501. The bath may include water and an acid (e.g., hydrofluoric acid, nitric acid ($HNO_3$), sulfuric acid ($H_2SO_4$), oxalic acid ($HC_2O_4$, or ammonium fluoride ($NH_4F$)). The chamber component is cleaned and then treated with ozone to form a metal oxide layer. In block 501, the used chamber component including a contamination layer is cleaned in a bath to remove the contamination layer. The hydrofluoric acid may be included in an amount from about 5 wt. % to about 15 wt. % in the bath based on the total composition of the bath. The water may be included in an amount from about 85 wt. % to about 95 wt. % in the bath based on the total composition of the bath. In some embodiments, the bath includes about 5 wt. % hydrofluoric acid and about 95 wt. % water. The bath may be at a temperature from about 25° C. to about 35° C. The used metal plated chamber component may be placed in the bath for about one minute to about 30 minutes to loosen the contamination layer. After soaking in the bath, the metal plated chamber may include a loosened contamination layer. The metal plated chamber component may then be rinsed (e.g., with deionized water) to remove the loosened contamination layer and dried at block 503.

The metal plated chamber component may then be polished after removing the contamination layer 505. The metal plated chamber component may be polished using an automatic polisher with different polishing sheets, such as a Scotch-Brite® sheet, or another advanced method to uniformly polish a surface. The metal plated coated chamber component may be polished until the surface roughness is about 10 µin to about 20 µin in one embodiment. After polishing, the metal plated coated chamber component may undergo an ozone treatment 507, as described in FIG. 5A.

In embodiments of the present disclosure, the barrier layer that is formed via the ozone treatment may be a uniform conformal layer (e.g., with a thickness variation of about +/−10% or less). The barrier layer of the present disclosure may be more resistant to ammonium fluoride than barrier layers formed using other methods or treatments of forming metal oxide barrier layers. That is, the barrier layer may be resistant from reacting to ammonium fluoride and does not discolor over time. Additionally, the barrier layer may produce an amount of particle contaminants after hours of use of the coated chamber component in processing as to be unmeasurable. In contrast, the chamber component when not coated with the metal oxide barrier layer produces a measureable amount of particle contaminants (e.g., about 100 particle contaminants). Similarly, the chamber component when coated with a metal oxide barrier layer produced via other coating techniques (e.g., as compared to a wet-bath acid process) produces a measureable amount of particle contaminants.

By treating the chamber component with an ozone treatment as described herein, a uniform barrier layer may be formed on the metal layer. In embodiments, the uniform barrier layer is a nickel oxide layer, and the metal layer is a nickel layer. This can be seen in FIG. 6, which is a TEM image of a nickel oxide barrier layer formed according to an embodiment on a nickel metal layer. The nickel oxide barrier layer was measured as having a thickness from about 13 nm to about 16 nm. Accordingly, the nickel oxide barrier layer had thickness variation of about +/−5-10% in an example. In contrast, a barrier layer formed using other methods, such as a wet acid bath treatment, is less predictable and can have varying thicknesses. For example, the barrier layer produced using a wet acid bath treatment was measured to have a thickness of about 6 nm in some places to about 35 nm in other places of the barrier layer. The wet acid bath treatment is performed by placing a chamber component in a bath including water and an acid (e.g., nitric acid ($HNO_3$), sulfuric acid ($H_2SO_4$), oxalic acid ($HC_2O_4$), or ammonium fluoride ($NH_4F$)) for about 1 minute to about 30 minutes at a temperature from about 25° C. to about 35° C. Accordingly, the nickel oxide barrier layer formed using the wet acid bath treatment had a thickness variation of about +/−70-75% in an example.

By treating the part with an ozone treatment to form a barrier layer as described herein, the inventors have found that the lifetime of the part may be more than 10 times that of the original coating that lacks the barrier layer. When an ENP coated layer chamber component is used, the standard lifetime is about 3000 cycles. When a barrier nickel oxide layer is present on the ENP coated layer, the lifetime of the part increases almost 5 times more than the standard lifetime of the part, where the lifetime is greater than 15,000 cycles.

Further, the inventors have found that the ozone method can be used to coat a new part. The inventors have found that the ozone treatment method is more efficient than previous methods to form a barrier layer of nickel oxide. Previous methods to form a barrier layer may include a wet bath acid, which includes exposure of a chamber component having a metal layer to ammonium fluoride and then recycle chemistry to remove any fluorinated layer that may have formed from the exposure to ammonium fluoride. Recycle chemistry may include placing the chamber component in a bath and rinsing to remove any fluorinated layer. The total treatment time of previous methods that use a wet acid bath can be about 30 to about 40 hours to form a target barrier layer. Advantageously, because no ammonium fluoride exposure and no recycle chemistry is used in the method set forth in embodiments herein, the total treatment time to form the barrier layer is reduced to about 10 hours to about 12 hours.

ILLUSTRATIVE EXAMPLES

The following examples are set forth to assist in understanding the disclosure and should not be construed as specifically limiting the disclosure described and claimed herein. Such variations of the disclosure, including the substitution of all equivalents now known or later developed, which would be within the purview of those skilled in the art, and changes in formulation or minor changes in experimental design, are to be considered to fall within the scope of the disclosure incorporated herein.

Example 1—Treatment of an ENP Coated Showerhead

Exemplified herein is a showerhead having a nickel plating and a nickel oxide barrier layer on the nickel plating. The showerhead was first coated with nickel layer using a metal plating process. In some embodiments, a natural oxide layer may be formed on the nickel plating prior to formation of an intentional nickel oxide layer. The natural nickel oxide layer has inferior properties and impedes the formation of a target nickel oxide layer that will reduce particle contamination and improve a lifespan of the chamber component. The native nickel oxide layer may have a thickness of about 2 to 3 nm. If a native oxide layer is formed, then this native oxide layer may be stripped using a solution of hydrofluoric acid (HF) and water, nitric acid ($HNO_3$) and water, or a mixture thereof. Once the native oxide layer has been stripped, or if no native oxide layer has been formed (e.g., if the same chamber is used to perform an ozone treatment as was used to form the metal plating or if the chamber used to perform the ozone treatment is connected to a same transfer chamber as the chamber used to form the metal plating), then an ozone treatment may be performed to form the metal oxide layer. The showerhead as illustrated underwent an ozone treatment in which the showerhead was placed in a chamber and was treated with ozone at 200° C. and atmospheric pressure for about 4 hours. After 4 hours, the showerhead was removed from the chamber and cooled. A barrier nickel oxide layer was found to have been formed over the nickel layer. The barrier nickel oxide (NiO) layer on the metal layer had a thickness of from about 13 nm to about 17 nm.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method of protecting a chamber component, consisting of:
   forming a metal plating directly on a surface of a body of the chamber component by performing electroless metal plating, wherein the metal plating comprises nickel, and
   subsequently forming a barrier layer directly on the metal plating using a one-step process consisting of performing an ozone treatment on the chamber component by contacting the body of the chamber component with an ozone gas, wherein the barrier layer comprises nickel oxide and mitigates formation of a black film.

2. The method of claim 1, wherein the performing the ozone treatment occurs at a temperature of from about 25° C. to about 350° C.

3. The method of claim 1, wherein the performing the ozone treatment occurs at atmospheric pressure.

4. The method of claim 1, wherein the performing the ozone treatment occurs for about 1 hour to about 50 hours.

5. The method of claim 1, wherein the barrier layer has a thickness from about 10 nm to about 50 nm.

6. The method of claim 1, wherein the metal plating further comprises phosphorus.

7. The method of claim 1, wherein the body comprises an aluminum alloy, aluminum nitride, alumina, or combinations thereof.

8. A method of protecting a chamber component, consisting of:
   forming a metal plating directly on a surface of a body of the chamber component by performing electroless metal plating, wherein the metal plating comprises nickel, and
   subsequently forming a barrier layer directly on the metal plating using a one-step process consisting of performing an ozone treatment on the chamber component by contacting the body of the chamber component with an ozone gas and at least of air, nitrogen, argon, or $O_2$, wherein the barrier layer comprises nickel oxide and mitigates formation of a black film.

* * * * *